(12) United States Patent  
Edamadaka et al.

(10) Patent No.: US 7,978,828 B1  
(45) Date of Patent: Jul. 12, 2011

(54) METHODS AND APPARATUS FOR MULTIMEDIA TRACKING

(75) Inventors: Rajeshwari Edamadaka, Allentown, NJ (US); Timothy Ian Ross, Fair Haven, NJ (US); James Edward Moore, Welwyn Garden City (GB)

(73) Assignee: Avaya Inc., Basking Ridge, NJ (US)

( * ) Notice: Subject to any disclaimer, the term of this patent is extended or adjusted under 35 U.S.C. 154(b) by 1301 days.

(21) Appl. No.: 11/584,781

(22) Filed: Oct. 19, 2006

(51) Int. Cl.
*H04M 11/00* (2006.01)

(52) U.S. Cl. ............... 379/88.13; 379/88.17; 379/88.25

(58) Field of Classification Search ............... 379/88.13, 379/88.22–88.25
See application file for complete search history.

(56) References Cited

U.S. PATENT DOCUMENTS

| | | | | |
|---|---|---|---|---|
| 5,568,540 A | * | 10/1996 | Greco et al. | 379/88.25 |
| 5,796,394 A | * | 8/1998 | Wicks et al. | 715/751 |
| 6,411,685 B1 | * | 6/2002 | O'Neal | 379/88.14 |
| 6,621,508 B1 | * | 9/2003 | Shiraishi et al. | 715/810 |
| 6,661,877 B1 | * | 12/2003 | Lee et al. | 379/67.1 |

* cited by examiner

*Primary Examiner* — Simon Sing  
(74) *Attorney, Agent, or Firm* — Chapin IP Law, LLC; David W. Rouille, Esq.

(57) ABSTRACT

A system collects a plurality of communications including at least two different types of communications. The system links the plurality of communications with an identifier that can be used to identify the plurality of communications, and stores the plurality of communications. The system allows a user to perform an action on at least one of the plurality of communications.

19 Claims, 9 Drawing Sheets

| MULTIMEDIA w/caller id | FROM | TO | DATE/Time |
|---|---|---|---|
| •Email (Bob's Yahoo Acl) | Bob | Alice | Feb 1, 2006 09:30am |
| •Email (Alice's hotmail account) With property listing in the area | Alice | Bob | Feb 1, 2006 09:45am |
| •Call(from web url) | Bob | Alice | Feb 3, 2006 11:00am |
| •Call(from mobile) | Alice | Bob | Feb 3, 2006 12:45pm |
| •Call (from Bob's home#) | Bob | Alice | Feb 3, 2007 1:45pm |
| •VoiceMail (from Bob's home#) | Bob | Alice | Feb 3, 2007 1:46pm |
| •IM Session (Alice's IM w/Text To Speech App) | Alice | Bob | Feb 5, 2006 3:00 pm |
| •Email/with Outlook Invite-to show a home with web links/preview | Alice | Bob | Feb 5, 2006 4:00pm |
| •SMS (Bob's cell to Alice) | Bob | Alice | Feb 6, 2006 9:50am |
| •Call (Alice to Bob on mobiles) | Alice | Bob | Feb 6, 2006 9:53am |
| •Email (Bob puts money down) Under contract review | Bob | Alice | Feb 6, 2006 4:00 pm |
| •Conference Call to Surveyor: | Alice/Bob | Fred | Feb 7, 2006 5:00 pm |
| •Email from Surveyor | Fred | Alice | Feb 9, 2006 11:30 am |
| •VoiceMail: Alice leaves msg with attachmnt from surveyor | Alice | Bob | Feb 9, 2006 12:00 noon |
| •Call:Bob closes on property | Bob | Alice | Feb 9, 2006 3:00 pm |
| Actions: Split Thread | Forward | Change Owner | Combine Thread |

205 ALLOW A USER TO PERFORM AN ACTION ON AT LEAST ONE OF THE PLURALITY OF COMMUNICATIONS

206 ALLOW A USER TO CREATE AT LEAST ONE SUPER PLURALITY OF COMMUNICATIONS FROM AT LEAST TWO PLURALITIES OF COMMUNICATIONS

↓

207 ASSOCIATE A UNIQUE IDENTIFIER TO THE AT LEAST ONE SUPER PLURALITY OF COMMUNICATIONS

OR

208 PROVIDE AN INTERFACE WITH WHICH TO ALLOW A USER TO PERFORM AN ACTION ON AT LEAST ONE OF THE PLURALITY OF COMMUNICATIONS

209 ALLOW A USER TO RESPOND TO AT LEAST ONE OF THE PLURALITY OF COMMUNICATIONS WITH A RESPONDING COMMUNICATION

↓

210 LINK THE RESPONDING COMMUNICATION WITH THE PLURALITY OF COMMUNICATIONS

*FIG. 5*

211 COLLECT A PLURALITY OF COMMUNICATIONS INCLUDING AT LEAST TWO DIFFERENT TYPES OF COMMUNICATIONS

212 IDENTIFY AT LEAST ONE OF THE PLURALITY OF COMMUNICATIONS AS AT LEAST ONE OF:
i) AN EMAIL
ii) A VOICEMAIL
iii) A PHONE CALL
iv) A SHORT MESSAGE SERVICE COMMUNICATION
v) AN INSTANT MESSAGE
vi) A FAX
vii) A VIDEO CALL

OR

213 RECEIVE A FIRST COMMUNICATION

214 ATTACH A HEADER TO THE FIRST COMMUNICATION

215 LINK THE PLURALITY OF COMMUNICATIONS WITH AN IDENTIFIER THAT CAN BE USED TO IDENTIFY THE PLURALITY OF COMMUNICATIONS

216 RECEIVE AT LEAST ONE SUBSEQUENT COMMUNICATION

217 ASSOCIATE THE AT LEAST ONE SUBSEQUENT COMMUNICATION WITH THE FIRST COMMUNICATION VIA THE HEADER

```
┌─────────────────────────────────────────────────────────────────────────┐
│ 222 LINK THE PLURALITY OF COMMUNICATIONS WITH AN IDENTIFIER THAT CAN BE │
│ USED TO IDENTIFY THE PLURALITY OF COMMUNICATIONS                        │
│                                                                         │
│      ┌─────────────────────────────────────────────────────────┐        │
│      │ 223 RECEIVE NOTIFICATION OF AN INCOMING COMMUNICATION   │        │
│      └─────────────────────────────────────────────────────────┘        │
│                                   │                                     │
│                                   ▼                                     │
│      ┌─────────────────────────────────────────────────────────┐        │
│      │ 224 PRESENT A SET OF PLURALITIES OF COMMUNICATIONS TO A USER │   │
│      └─────────────────────────────────────────────────────────┘        │
│                                   │                                     │
│                                   ▼                                     │
│      ┌─────────────────────────────────────────────────────────┐        │
│      │ 225 RECEIVE A SELECTION OF AT LEAST ONE OF THE SET OF   │        │
│      │ PLURALITIES OF COMMUNICATIONS                           │        │
│      └─────────────────────────────────────────────────────────┘        │
│                                   │                                     │
│                                   ▼                                     │
│      ┌─────────────────────────────────────────────────────────┐        │
│      │ 226 LINK THE INCOMING COMMUNICATION TO THE SELECTION OF THE │    │
│      │ AT LEAST ONE OF THE SET OF PLURALITIES OF COMMUNICATIONS │       │
│      └─────────────────────────────────────────────────────────┘        │
└─────────────────────────────────────────────────────────────────────────┘
```

METHODS AND APPARATUS FOR MULTIMEDIA TRACKING

BACKGROUND

Conventional computerized devices, such as personal computers, laptop computers, telephones, and the like, allow people to communicate via telephone, cell phone, voicemail, email, instant messaging, fax, video call, etc. Multiple channels for contact facilitate communications, while the ability to archive the content of the communication (i.e., storing voicemail, saving email, filing a fax, recording a video call, etc.) provides an additional benefit for subsequent use of the content of the communications. Typically, computerized devices that receive calls (such as a telephone, cell phone, etc.) can be equipped with applications that allow for receiving and storing phone calls received when the recipient (of the call) is not available. Likewise, emails can be stored on a computer, even on a computer other than the computer on which the emails were received.

SUMMARY

Conventional technologies for tracking multimedia suffer from a variety of deficiencies. In particular, conventional technologies for tracking multimedia are limited in that multimedia communications (i.e., voicemail, email, phone calls, instant messages, faxes, video calls, etc.) are received, and stored on different devices. For example, email is received on a user's computer and stored on that computer. Phone calls, voicemail and text messages are received via a user's cell phone, and stored in a voicemail 'mailbox' provided by the cell phone service carrier. Likewise, instant messages received on a computer can be stored on that computer (or another computer).

The communications received via cell phone, email and instant messaging may be related in that those communications are sent to and received from two users. The content of the communications may even relate to a similar subject, despite the different venues of communication. For example, using a cell phone, user "Mary" calls user "Joe" on his cell phone, and leaves a voicemail regarding a party on Saturday night. Joe responds by sending a text message to Mary's cell phone indicating that Joe will attend the party. Mary then emails Joe with directions to the party. These messages (i.e., voicemail, text messaging and email) are related to each other in that the messages occurred between Mary and Joe. The messages are also related because they pertain to the same subject. Joe can save Mary's voicemail on his cell phone (i.e., on the "mailbox" storage space provided by the cell phone service carrier), and Mary can save Joe's text message on her cell phone (i.e., on the "mailbox" storage space provided by the cell phone service carrier). Likewise, Joe can save Mary's email on his computer, and Mary can save a copy of the email she sent to Joe on Mary's computer. However, there is no way to collect and link all these messages together to track the chronology of the conversation between the 2 parties for a particular purpose.

Embodiments disclosed herein significantly overcome such deficiencies and provide a system that includes a computer system executing a multimedia tracking process that allows communications of various types (i.e., email, voicemail, phone call, instant message, text message, fax, video call, etc.) to be amassed into a collection, and linked together via a common thread, regardless of the type of communication. A user can access the collection (i.e., via a web page, folder, etc.), and perform actions on the collection, such as splitting the collection into multiple collections, forwarding the collection to another user, etc.

The multimedia tracking process receives a first communication, such as an email, voice mail, text message, etc. The multimedia tracking process attaches a header with a unique identifier to the first communication. Subsequent communications can be made by responding to the initial communication, for example, by selecting the first communication, and then selecting the mode of communication; phone call, email, instant messaging, etc. When the user selects and chooses to responds to first communication, the second communication is triggered and the unique identifier is added automatically. A signaling protocol, such as Session Initiation Protocol (SIP), is used to achieve different modes of communication, for example, voice call, video call, instant messaging, etc. Therefore, there is a convergence, and such response mechanisms are available. In an example embodiment, the tracking system is pre-populated with all details of the various contact addresses of the 2 parties (home/work/cell numbers, email address, instant messaging user identifier, etc.), so that any subsequent communication can be associated to the plurality of communications, based on a user initiating the call. Other embodiments include scanning communication for references such as subject of an already existing active thread. Subsequent communications that are received related to that first communication are linked to the first communication via the unique identifier. The multimedia tracking process identifies the subsequent communications as being related to the first communication via a variety of ways. For example, a subsequent phone call may originate from a phone number that corresponds to a phone number associated with the first communication. In an example embodiment, the multimedia tracking process provides multiple pluralities of communications (i.e., 'threads') to a user via an interface. The multimedia tracking process provides a list of active and inactive threads to a user. As each new communication arrives, the multimedia tracking process associates the new communication with one of the existing threads, or creates a new thread. When the user responds to the communications in a thread (i.e., returns a phone call, email, text message, etc.), the multimedia tracking process links the responding communication to the appropriate thread. The user can create sub threads out of a single thread, or combine multiple threads to create a super thread. In an example embodiment, a user can name a thread for easier identification. The user can re-name the thread at a later time. The name of the thread may be the global subject for the entire thread, for example, "Homes for Mr. Bob, Yardley, Pa.", or an altered one, for example, "Ready to close", that is more meaningful for that particular instance of communication. The multimedia tracking process maintains the name of the thread for each instance of the communication internally as a combination help tracking and presentation later on, for example, "Homes for Mr. Bob, Yardley, Pa.—Ready to close".

In an example embodiment, all the media is controlled from one device, such as a computer system, cell phone, etc. For example, user Alice receives email from user Bob. Alice chooses to respond to the email with a phone call, and in the email client (in which she received user Bob's email), user Alice selects the email. Instead of selecting "reply to", user Alice selects "relay to via phone". The multimedia tracking process, via the email application, performs a SIP 'click to dial' on user Alice's phone, automatically injecting the thread header. User Bob answers the call, talks, and hangs up. Later user Bob looks through his call logs on his phone, and sees the phone call from user Alice with the thread header. User Bob makes a selection to respond to user Alice with an email. The multimedia tracking process launches an email, automatically populating the thread header.

In an example embodiment, the multimedia tracking process receives an incoming communication and associates the incoming communication to an existing thread. The multimedia tracking process displays the selected thread to the user, and requests that the user confirm the selected thread is the correct thread with which to associate the incoming communication.

The multimedia tracking process collects a plurality of communications including at least two different types of communication, and links the plurality of communications with an identifier that can be used to identify the plurality of communications. The multimedia tracking process then stores the plurality of communications or, and allows a user to perform an action on at least one of the plurality of communications. In an example embodiment, the multimedia tracking process stores information with references of plurality of communications, if one or more of the plurality of communications are stored elsewhere, for example, email stored on an exchange server, etc. During an example operation of one embodiment, suppose a real estate agent receives an email from a prospective homebuyer. The multimedia tracking process attaches a header, with a unique identifier, to the email, creating a thread of communication between the homebuyer and the real estate agent. The real estate agent can identify the thread with a designation that is meaningful to the real estate agent, for example, "Potential Home Buyer for Westfield Farms Estates". The real estate agent replies to the homebuyer with an email, and the multimedia tracking process links the real estate agent's email to the "Potential Home Buyer for Westfield Farms Estates" thread. The real estate agent follows up the email with a phone call to the homebuyer, using a phone number provided by the homebuyer in the initial email sent to the real estate agent. The multimedia tracking process associates the phone call (from the real estate agent to the homebuyer) to the "Potential Home Buyer for Westfield Farms Estates" thread by parsing the initial email (from the homebuyer to the real estate agent), gleaning the homebuyer's phone number from within the email, and associating the phone call (from the real estate agent to the homebuyer) to the phone number provided by the homebuyer in the initial email to the real estate agent. As the communications between the real estate agent and the homebuyer continue via email phone calls, voice mail, text messaging, instant messaging, etc, those communications (whether from the real estate agent to the homebuyer or from the homebuyer to the real estate agent) are linked to the "Potential Home Buyer for Westfield Farms Estates" thread. The real estate agent can view the plurality of communications in the "Potential Home Buyer for Westfield Farms Estates" thread, for example, in a folder, or on a web page. The real estate agent may transfer the "Potential Home Buyer for Westfield Farms Estates" thread to a new real estate agent, giving the new real estate agent a history of all the communications between the real estate agent and the homebuyer.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Avaya Incorporated of Basking Ridge, N.J.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a multimedia tracking process that allows communications of various types (i.e., email, voicemail, phone call, instant message, text message, fax, video call, etc.) to be amassed into a collection, and linked together via a common thread, regardless of the type of communication. A user can access the collection (i.e., via a web page, folder, etc.), and perform actions on the collection, such as splitting the collection into multiple collections, forwarding the collection to another user, etc.

The multimedia tracking process receives a first communication, such as an email, voice mail, text message, etc. The multimedia tracking process attaches a header with a unique identifier to the first communication. Subsequent communications that are received related to that first communication are linked to the first communication via the unique identifier. The multimedia tracking process identifies the subsequent communications as being related to the first communication via a variety of ways. For example, a subsequent phone call may originate from a phone number that corresponds to a phone number associated with the first communication. In an example embodiment, the multimedia tracking process provides multiple pluralities of communications (i.e., 'threads') to a user via an interface. The multimedia tracking process provides a list of active and inactive threads to a user. As each new communication arrives, the multimedia tracking process associates the new communication with one of the existing threads, or creates a new thread. When the user responds to the communications in a thread (i.e., returns a phone call, email, text message, etc.), the multimedia tracking process links the responding communication to the appropriate thread. The user can create sub threads out of a single thread, or combine multiple threads to create a super thread. In an example embodiment, a user can name a thread for easier identification. The user can re-name the thread at a later time.

In an example embodiment, the multimedia tracking process receives an incoming communication and associates the incoming communication to an existing thread. The multimedia tracking process displays the selected thread to the user, and requests that the user confirm the selected thread is the correct thread with which to associate the incoming communication.

In an example embodiment, all the media is controlled from one device, such as a computer system, cell phone, etc. A user can receive an email, and respond with a phone call. The multimedia tracking process associates the incoming email with a thread. When the user responds to the email with a phone call (for example, by selecting the email and selecting an option to respond by phone), the multimedia tracking process associates the outgoing phone call with the thread associated with the email.

The multimedia tracking process collects a plurality of communications including at least two different types of communication, and links the plurality of communications with an identifier that can be used to identify the plurality of communications. The multimedia tracking process then stores the plurality of communications, and allows a user to perform an action on at least one of the plurality of communications.

Figure 1:
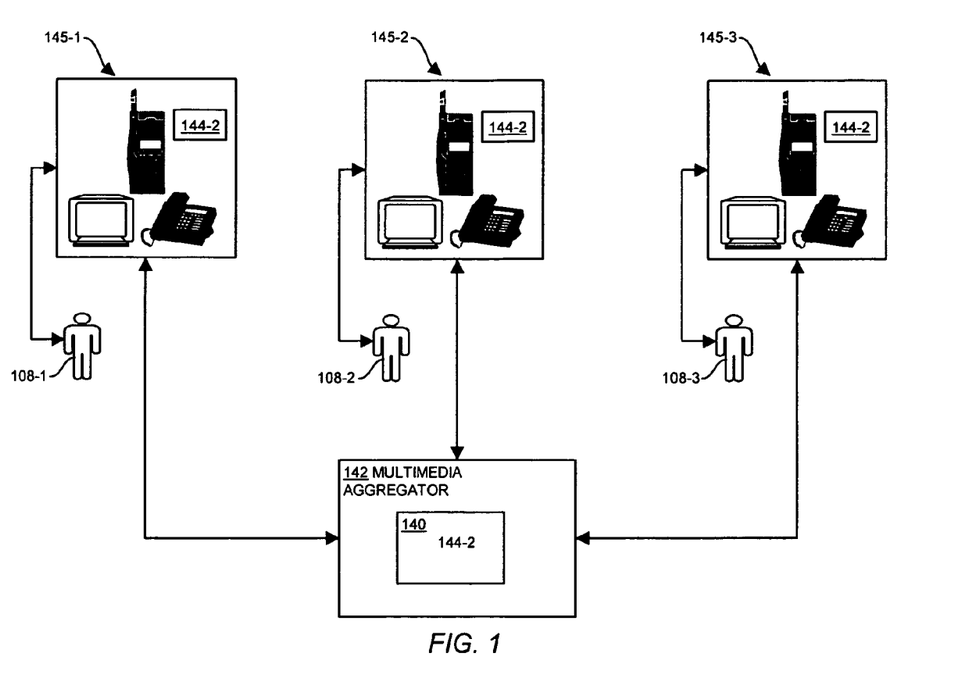
FIG. 1 shows a high level view of a system executing a multimedia tracking process according to one embodiment disclosed herein.
Figure 2:
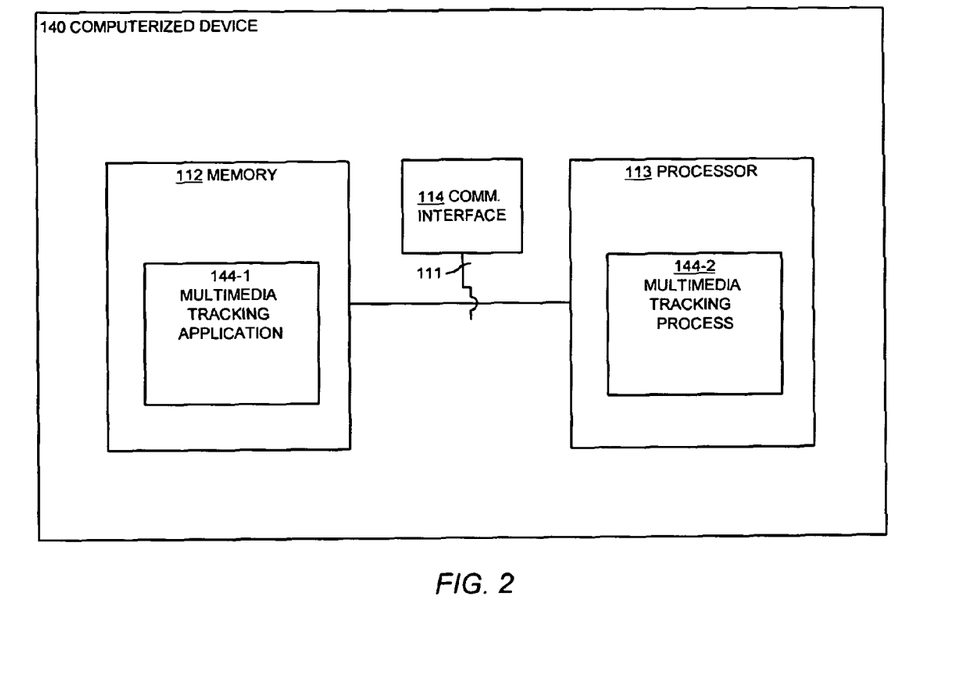
FIG. 2 shows a high-level block diagram of a computer system according to one embodiment disclosed herein

FIG. 1 is an example screenshot of high-level view of a system executing a multimedia tracking process according to one embodiment disclosed herein. Users 108-N communicate via a device 145-N, such as computer, cell phone, telephone, etc. Each device 145-N runs an instance of the multimedia tracking process 144-2. The users 108-N may receive communications from users (not shown) operating devices (not shown) that are not running an instance of the multimedia tracking process 144-2. As the users 108-N communicate, their communications are transmitted to a multimedia aggregator 142. The multimedia aggregator 142 collects, and links the plurality of communications. The multimedia tracking process 144-2 allows the users 108-N to review the plurality of communications via an interface on the devices 145-N. The multimedia aggregator 142 is also running an instance of the multimedia tracking process 144-2, via, for example, a computerized device 140. FIG. 2 explains further details of the computerized device running an instance of the multimedia tracking process 144-2.

FIG. 2 illustrates an example architecture of a computer system 140. The computer system 140 may be any type of computerized device such as a personal computer, workstation, portable computing device, console, laptop, network terminal or the like. In this example, the computer system 140 includes an interconnection mechanism 111 that couples a memory system 112, a processor 113, and a communications interface 114. The communications interface 114 enables the computer system 140 to communicate with other devices (i.e., other computers) on a network (not shown). This can allow access to the multimedia tracking application by remote computer systems.

The memory system 112 may be any type of computer readable medium that is encoded with a multimedia tracking application 144-1 that may be embodied as software code such as data and/or logic instructions (e.g., code stored in the memory or on another computer readable medium such as a removable disk) that supports processing functionality according to different embodiments described herein. During operation of the computer system 140, the processor 113 accesses the memory system 112 via the interconnect 111 in order to launch, run, execute, interpret or otherwise perform the logic instructions of the multimedia tracking application 144-1. Execution of multimedia tracking application 144-1 in this manner produces processing functionality in a multimedia tracking process 144-2. In other words, the multimedia tracking process 144-2 represents one or more portions of runtime instances of the multimedia tracking application 144-1 (or the entire application 140-1) performing or executing within or upon the processor 113 in the computerized system 140 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Figure 3:
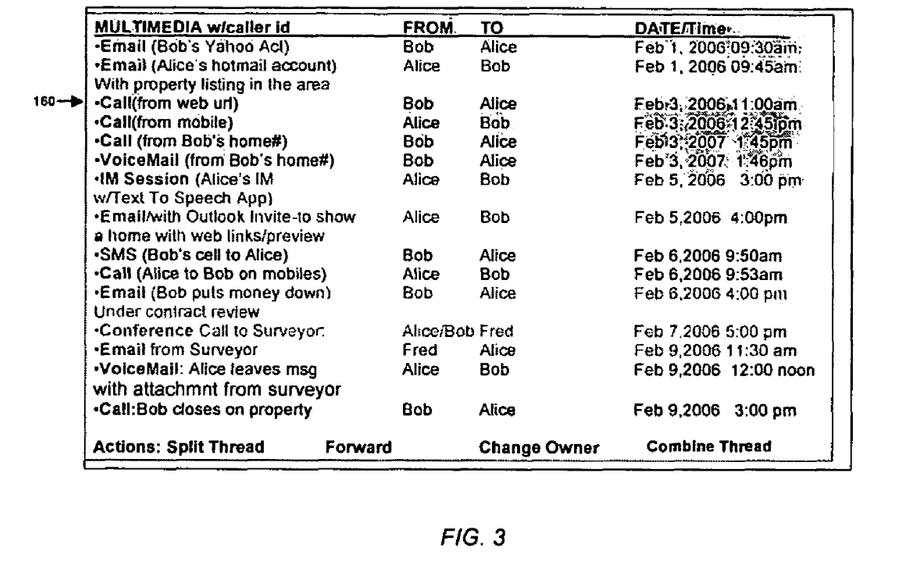
FIG. 3 illustrates an example screenshot of a session interface that allows a user to perform an action on a plurality of communications.

FIG. 3 illustrates an example screenshot of a user interface 160 that allows a user 108 to review the plurality of communications, and perform actions on the plurality of communications. In an example embodiment, the interface 160 lists the communications that are associated with a thread (i.e., a plurality of communications), the type of communication (i.e., email, phone call, instant message, etc.), the sender user 108-1, the recipient user 108-2, and a timestamp associated with the communication. In an example embodiment, the user interface 160 a global subject (i.e., name of the thread) field may be displayed. The global subject may be an altered subject for that instance of communication, for example, "Mr. Bob, Homes in Yardley, Pa.", or "Ready to Close". A user 108 may select each of the listed rows to access, and review the communication thread. For example, if the communication is an email, a user 108 can click on the email and the email will be displayed. In another example, if the user 108 selects a communication that is a voicemail, selecting the voicemail results in the voicemail being played. A user 108 can perform an action on the thread, such as splitting a thread (i.e., a plurality of communications), creating a thread out of two or more pluralities of communication, forwarding a thread to another user 108, changing the owner of a thread, etc.

Further details of configurations explained herein will now be provided with respect to a flow chart of processing steps that show the high level operations disclosed herein to perform the content formatting process.

Figure 4:
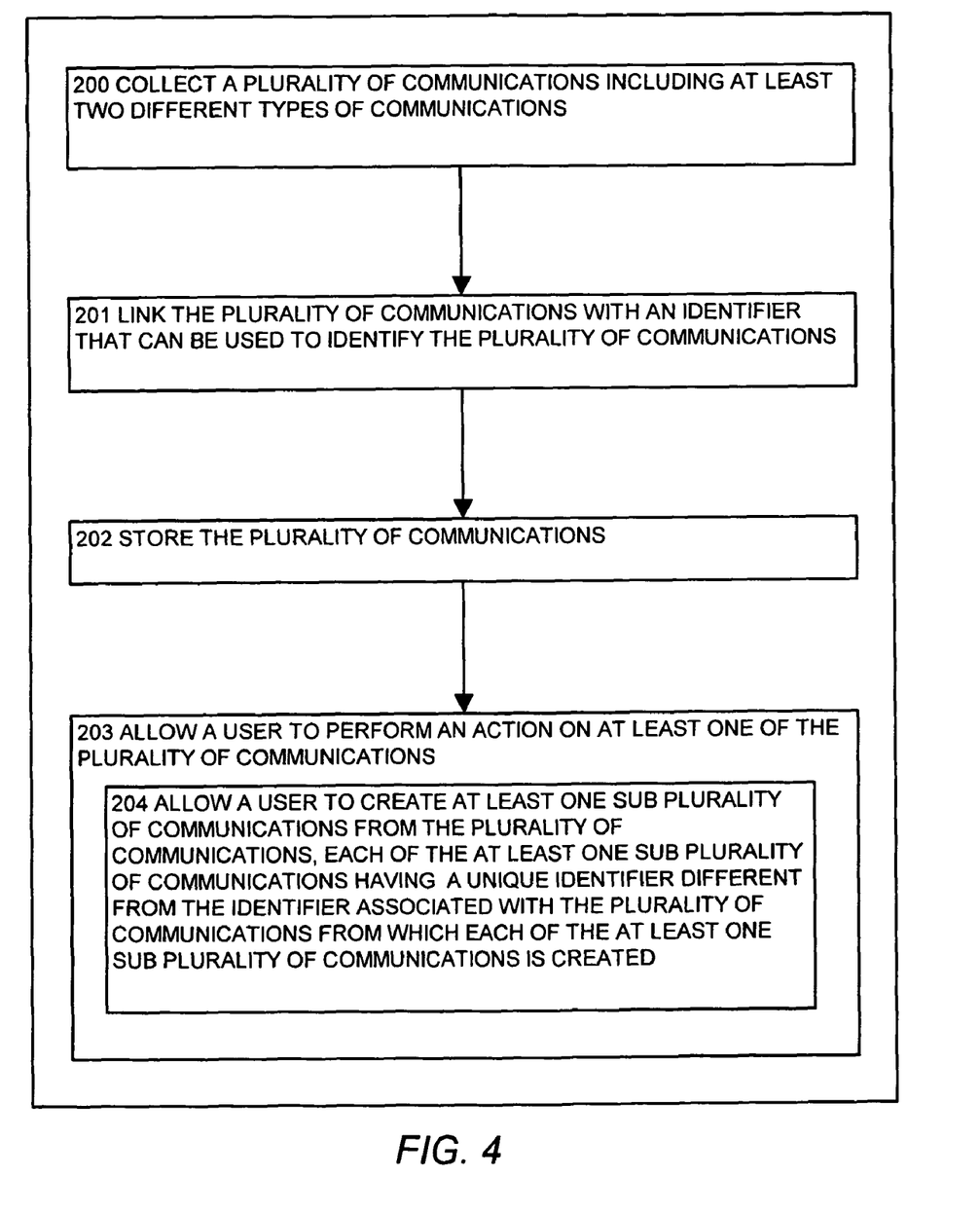
FIG. 4 illustrates a flowchart of a procedure performed by the system of FIG. 1, when the multimedia tracking process collects a plurality of communications including at least two different types of communications, according to one embodiment disclosed herein.

FIG. 4 is an embodiment of the steps performed by the multimedia tracking process 144-2 when it collects a plurality of communications including at least two different types of communications.

In step 200, the multimedia tracking process 144-2 collects a plurality of communications including at least two different types of communications. A user 108-1 may receive a phone call, voicemail, text messaging, etc., (from another user 108-2) related to the same topic. For example, a user 108-2 who is seeking employment may communicate with a potential employer user 108-1 via email, voicemail, telephone, etc. For example, the user 108-2 seeking employment may email a cover letter and a resume to the potential employer 108-1, and then follow up with a phone call to the potential employer 108-1, leaving voicemail for the potential employer 108-1. While the communications may be of different types (i.e., email, voicemail, telephone, etc.), they all relate to the same topic (i.e., employment), and occur between the user 108-2 who is seeking employment and the potential employer user 108-1

In step 201, the multimedia tracking process 144-2 links the plurality of communications with an identifier that can be used to identify the plurality of communications. The multimedia tracking process 144-2 maintains the 'thread' of conversation by use of the unique identifier. In an example embodiment, the unique identifier can be, for example, a unique integer. In another example embodiment, the user 108 may specify an identifier by which to refer to the plurality of communication. The identifier may be a descriptive name (provided by the user 108) for the plurality of communication, such as "Accounting Position at ACME Corporation". The descriptive name enables the user 108 to quickly and easily distinguish threads (i.e., pluralities of communication).

In step 202, the multimedia tracking process 144-2 stores the plurality of communications. In an example embodiment, the multimedia tracking process 144-2 stores the plurality of communications in a database in communication with the multimedia aggregator 142. The plurality of communications can be retrieved from the database, via database commands, such as Structured Query Language (SQL). The database may exist on the multimedia aggregator 142. The database may exist on a system separate from the multimedia aggregator 142, and may be accessed by the multimedia aggregator 142. In an example embodiment, some of the pluralities of communication are not stored on the database, but a reference to those pluralities of communication is stored in the database.

In step 203, the multimedia tracking process 144-2 allows a user 108 to perform an action on at least one of the plurality of communications. The multimedia aggregator 142 can store multiple pluralities of communication. The multimedia tracking process 144-2 allows a user 108 to perform actions on the pluralities of communication such as forwarding a plurality of communications to another user 108. The plurality of communication may be access on a web page, in a folder, etc. A user 108-1 may determine which other users 108-N have access to the plurality of communications (i.e., via the web page, folder, etc.), and can also forward the plurality of communications to other users 108-N.

In an example embodiment, a user 108-1 is assigned as the owner of a plurality of communications, and the user 108-1 can reassign another user 108-2 as the owner of the plurality of communications.

In step 204, the multimedia tracking process 144-2 allows a user 108 to create at least one sub plurality of communications from the plurality of communications. Each of the at least one sub plurality of communications has a unique identifier that is different from the identifier associated with the plurality of communications from which each of the at least one sub plurality of communications is created. In other words, a user 108 can create multiple sub threads out of a thread (i.e., a plurality of communications). For example, a user 108-1 can create a sub plurality of communications from a plurality of communications and assign the sub plurality of communications to a different user 108-2.

Figure 5:
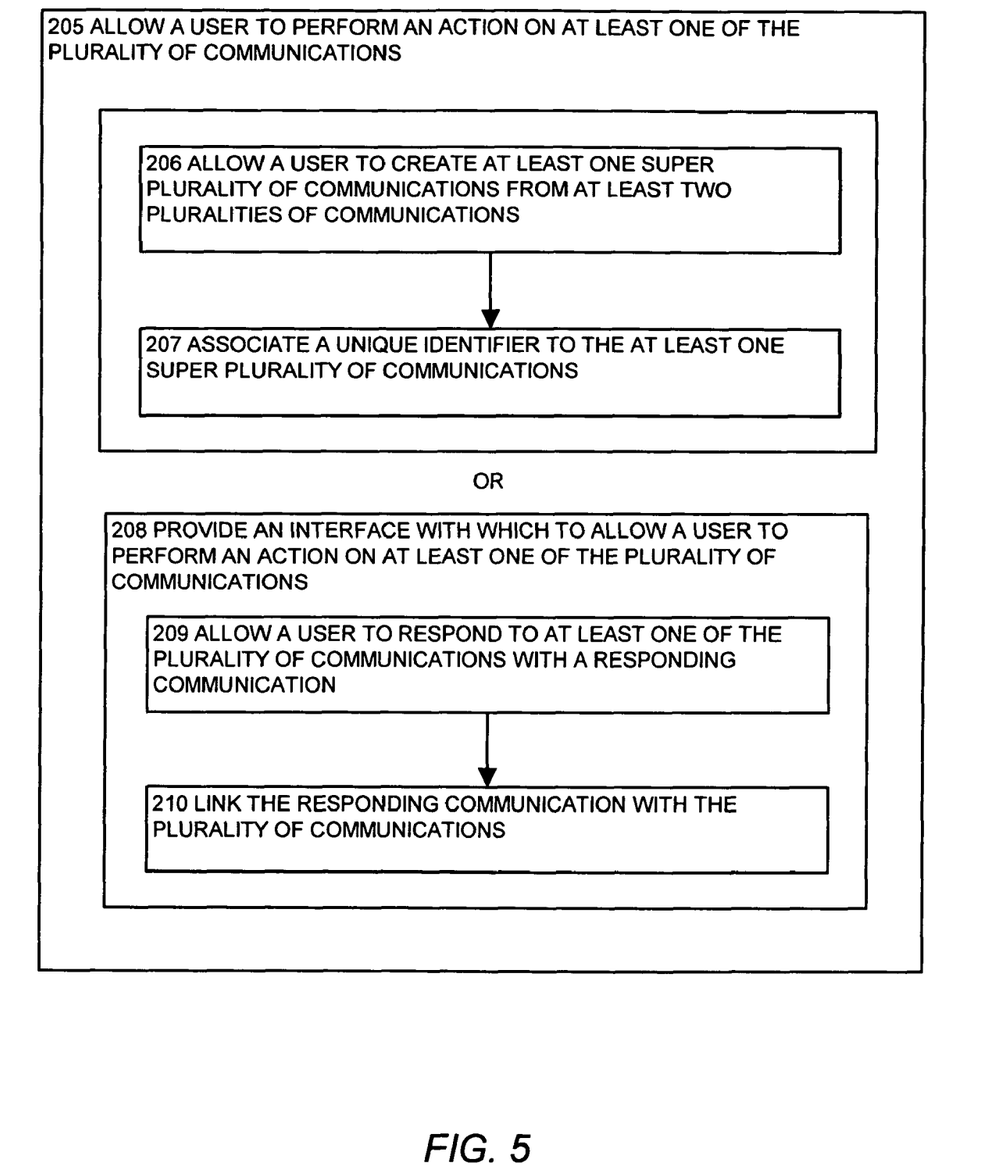
FIG. 5 illustrates a flowchart of a procedure performed by the system of FIG. 1, when the multimedia tracking process allows a user to perform an action on at least one of the plurality of communications, according to one embodiment disclosed herein.

FIG. 5 is a continuation of an embodiment of FIG. 4 of the steps performed by the multimedia tracking process 144-2 when it allows a user 108 to perform an action on at least one of the plurality of communications.

In step 206, the multimedia tracking process 144-2 allows a user 108 to create at least one super plurality of communications from at least two pluralities of communications. In an example embodiment, a user 108 can create a super plurality of communications (i.e., a super thread) out of two or more pluralities of communications (i.e., threads). For example, a user 108-1 is a real estate agent communicating with a user 108-2 who is interested in buying a house that the real estate agent user 108-1 is selling. The multimedia tracking process 144-2 creates a thread (i.e., a plurality of communications) associated with user 108-2 who is interested in buying the house. Meanwhile, another user 108-3 begins to communication with the real estate agent user 108-3 about buying the same house. The multimedia tracking process 144-2 creates a separate thread (i.e., a plurality of communications) associated with user 108-3 who is interested in buying the house. The multimedia tracking process 144-2 allows the real estate agent user 108-1 to combine the two pluralities of communication (i.e., the first plurality of communication between the real estate agent 108-1 and the first buyer user 108-2, and the second plurality of communication between the real estate agent 108-1 and the second buyer user 108-3) using the interface 160. Thus, by creating a super plurality of communications for multiple buyers interested in buying the same house, real estate agent user 108-1 can better track the progress of the negotiations and sale of the house. In an example embodiment, the multimedia tracking process maintains the original thread, the sub threads that are created from an original thread and the super thread created from one or more threads.

In step 207, the multimedia tracking process 144-2 associates a unique identifier to at least one super plurality of communications. The multimedia tracking process 144-2 allows a user 108 to create a super plurality of communications between two or more pluralities of communication. Once created, the multimedia tracking process 144-2 associates a unique identifier with the super plurality of communications such that any subsequent communications (associated with the super plurality of communications) are appropriately linked to the super plurality of communications. In other words, any communications from the two buyers (interested in the same house) to the real estate agent user 108-1 will be associated with the super plurality of communications associated with the potential sale of the house.

Alternatively, in step 208, the multimedia tracking process 144-2 provides an interface 160 with which to allow a user 108 to perform an action on at least one of the plurality of communications (i.e., threads). The interface 160 allows a user to view the threads, split the threads into multiple threads, forward a thread, change the owner of a thread, etc.

In step 209, the multimedia tracking process 144-2 allows a user 108 to respond to at least one of the plurality of communications with a responding communication. For example, a user 108 receives a phone call. The multimedia tracking process 144-2 links the incoming phone call to an existing thread (i.e., plurality of communications). The user 108 returns the phone call. In an example embodiment, the user 108 specifies that the phone call will be returned in, for example, ten minutes. The multimedia tracking process 144-2 inserts a notice in the user's 108 calendar software to notify the user to return the call in the specified ten minutes. When the ten minutes have passed, the multimedia tracking process 144-2 initiates the return phone call from the user 108 to the caller who originally placed the initial phone call received by the user 108. The caller may or may not have the multimedia tracking process 144-2 operating on his/her phone.

In step 210, the multimedia tracking process 144-2 links the responding communication with the plurality of communications. When the user 108 returns the phone call, the multimedia tracking process 144-2 links the return phone call with the existing thread (i.e., plurality of communications). In other words, the act of returning a phone call associated with an existing plurality of communications (i.e., thread) automatically links the return phone call with that plurality of communications (i.e., thread).

Figure 6:
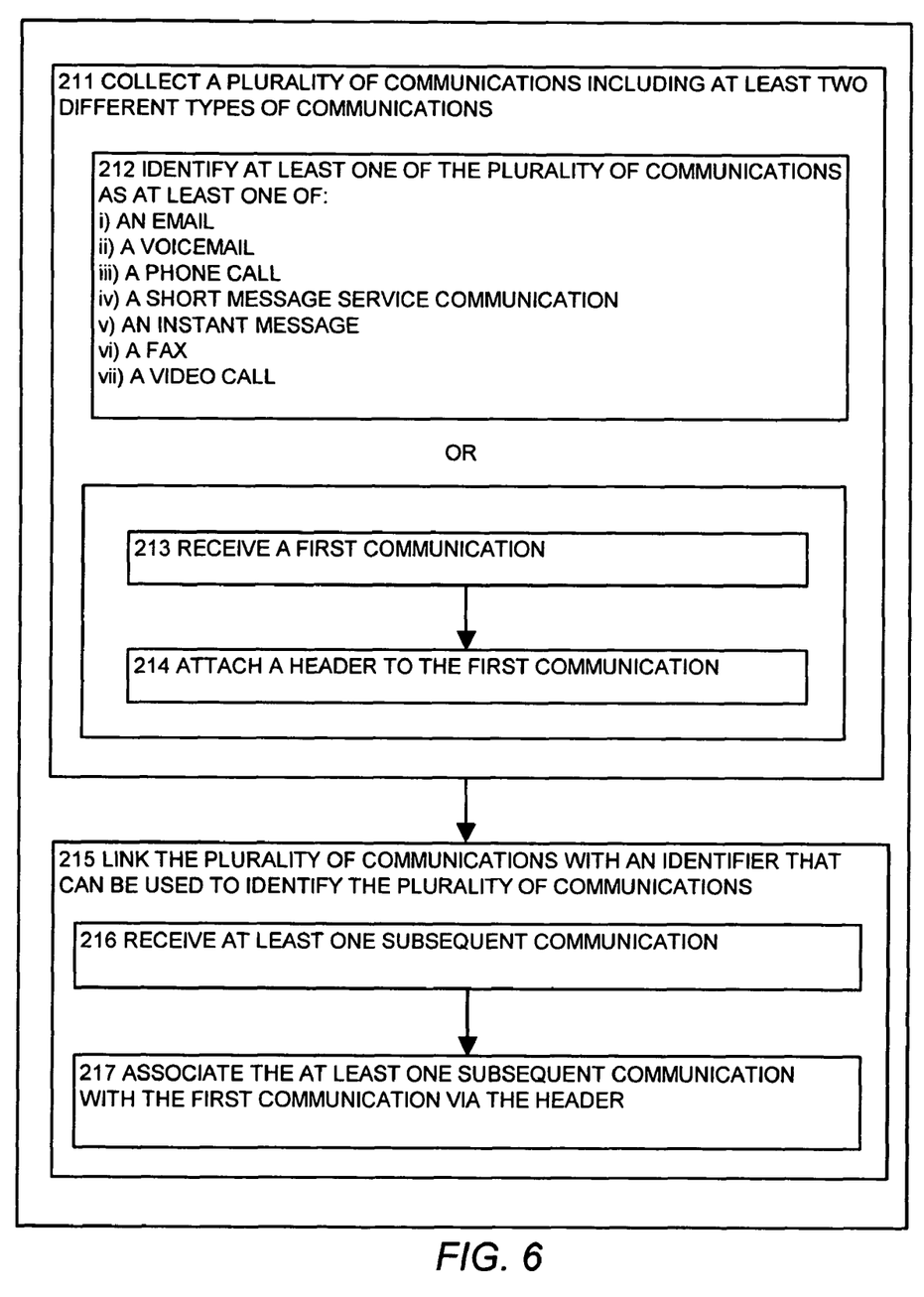
FIG. 6 illustrates a flowchart of a procedure performed by the system of FIG. 1, when the multimedia tracking process collects a plurality of communications including at least two different types of communications, according to one embodiment disclosed herein.

FIG. 6 is an embodiment of the steps performed by the multimedia tracking process 144-2 when it collects a plurality of communications including at least two different types of communications.

In step 211, the multimedia tracking process 144-2 collects a plurality of communications including at least two different types of communications. For example, a user 108-1 may receive a phone call, voicemail, text messaging, instant message, etc., from another user 108-2.

In step 212, the multimedia tracking process 144-2 identifies at least one of the plurality of communications as at least one of:
  i) an email,
  ii) a voicemail,
  iii) a phone call,
  iv) a short message service communication,
  v) an instant message,
  vi) a fax, and
  vii) a video call.

Alternatively, in step 213, the multimedia tracking process 144-2 receives a first communication. When an incoming communication (i.e., email, phone call, text message, etc.) arrives, the multimedia tracking process 144-2 attempts to associate the incoming communication with an existing thread (i.e., plurality of communications). If the multimedia tracking process 144-2 determines the incoming communication is the beginning of a new thread, (i.e., plurality of communications), the multimedia tracking process 144-2 creates that new thread (i.e., plurality of communications). In an example embodiment, the multimedia tracking process 144-2 presents a list of active and inactive threads (i.e., pluralities of communications) to the user 108, and allows the user 108 to link the incoming communication to an existing thread (either an active thread or an inactive thread). The multimedia tracking process 144-2 also allows the user 108 to specify that a new thread (i.e., plurality of communications) should be created for the incoming communication.

In step 214, the multimedia tracking process 144-2 attaches a header to the first communication. Upon determining that an incoming communication is the beginning of a new thread (i.e., plurality of communications), the multimedia tracking process 144-2 attaches a header to the incoming communication. The head contains the unique identifier by which the thread (i.e., plurality of communications) will be tracked/identified.

In step 215, the multimedia tracking process 144-2 links the plurality of communications with an identifier that can be used to identify the plurality of communications. Communications, associated with an initial communication that arrive after an initial communication, are linked to that initial communication via the unique identifier.

In step 216, the multimedia tracking process 144-2 receives at least one subsequent communication. In an example embodiment, the multimedia tracking process 144-2 receives an initial communication, and attaches a header containing a unique identifier. Then, the multimedia tracking process 144-2 receives a subsequent communication that is associated with the initial communication.

In step 217, the multimedia tracking process 144-2 associates the subsequent communication with the first communication via the header. The multimedia tracking process 144-2 creates a plurality of communications from the initial communication, and the subsequent communication (and any other subsequent communications that are associated with that thread). The unique identifier in the header associates the initial communication and any subsequent communications that are associated with the initial communication.

Figure 7:
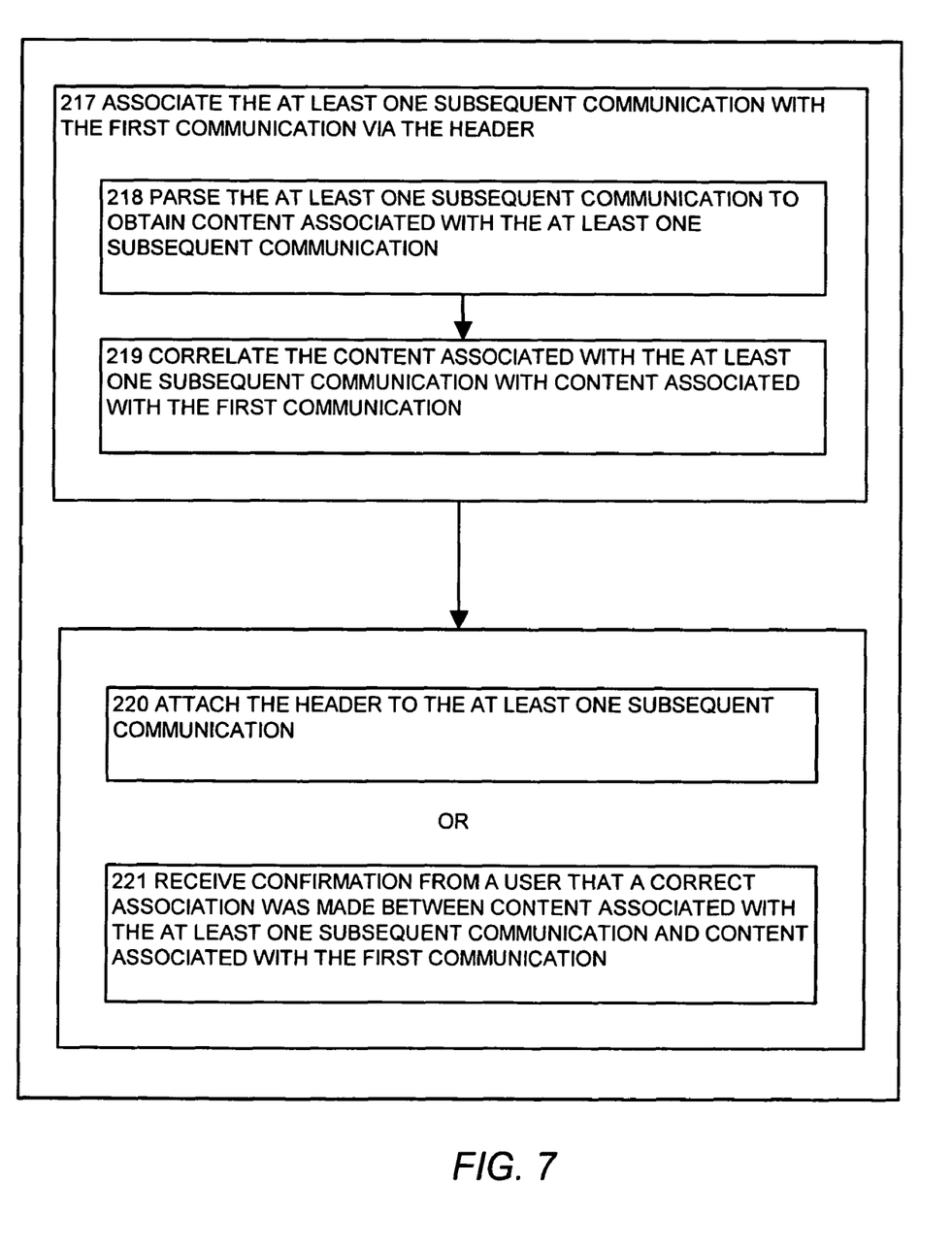
FIG. 7 illustrates a flowchart of a procedure performed by the system of FIG. 1, when the multimedia tracking process associates the at least one subsequent communication with the first communication via the header, according to one embodiment disclosed herein.

FIG. 7 is a continuation of an embodiment of FIG. 6 of the steps performed by the multimedia tracking process 144-2 when it associates the subsequent communication with the first communication via the header.

In step 218, the multimedia tracking process 144-2 parses at least one subsequent communication to obtain content associated with the subsequent communication. The multimedia tracking process 144-2 associates subsequent communications with an initial communication by parsing information contained within each of the subsequent communications. For example, a subsequent communication is an email. The multimedia tracking process 144-2 parses the email to obtain the name of the sender or the recipient to determine which thread (i.e., plurality of communications) to associate the incoming email with. In an example embodiment, SIP technology is utilized, and the subsequent communication contains the same unique identifier associated with the thread (i.e., plurality of communications). The unique identifier associated with the subsequent communication is triggered by a user 108 response to a first communication. The multimedia tracking process 144-2 creates the response by embedding the unique identifier in the initial communication, and processing the subsequent communication as usual. In another example, a subsequent communication is a phone call. The multimedia tracking process 144-2 examines the phone call to determine the phone number from which the phone call is originating, and associates that phone number with an exiting thread (i.e., plurality of communications).

In step 219, the multimedia tracking process 144-2 correlates the content associated with the subsequent communication with content associated with the first communication. In an example embodiment, the multimedia tracking process 144-2 parses an email, and obtains the email sender's name. The multimedia tracking process 144-2 correlates the email senders name with a name found in a text message that is contained within an existing thread (i.e., plurality of communications). The multimedia tracking process 144-2 then associates the email with that existing thread (i.e., plurality of communications).

In step 220, the multimedia tracking process 144-2 attaches the header to the at least one subsequent communication. In an example embodiment, the multimedia tracking process 144-2 determines an incoming email is associated with an existing thread (i.e., plurality of communications), and attaches a header (containing an unique identifier) to the email to associate the email with that existing thread (i.e., plurality of communications).

Alternatively, in step 221, the multimedia tracking process 144-2 receives confirmation from a user 108 that a correct association was made between content associated with the subsequent communication, and content associated with the first communication. In an example communication, the multimedia tracking process 144-2 parses the content of an incoming communication and determines a potential existing thread (i.e., plurality of communications) to which the incoming communication may be associated. The multimedia tracking process 144-2 displays the potential existing thread (i.e., plurality of communications) to the user 108 via the interface 160, and asks the user 108 to confirm that the appropriate thread (i.e., plurality of communications) has been determined. The user 108 confirms the selected thread (i.e., plurality of communications) as the appropriate thread (i.e., plurality of communications).

Figure 8:
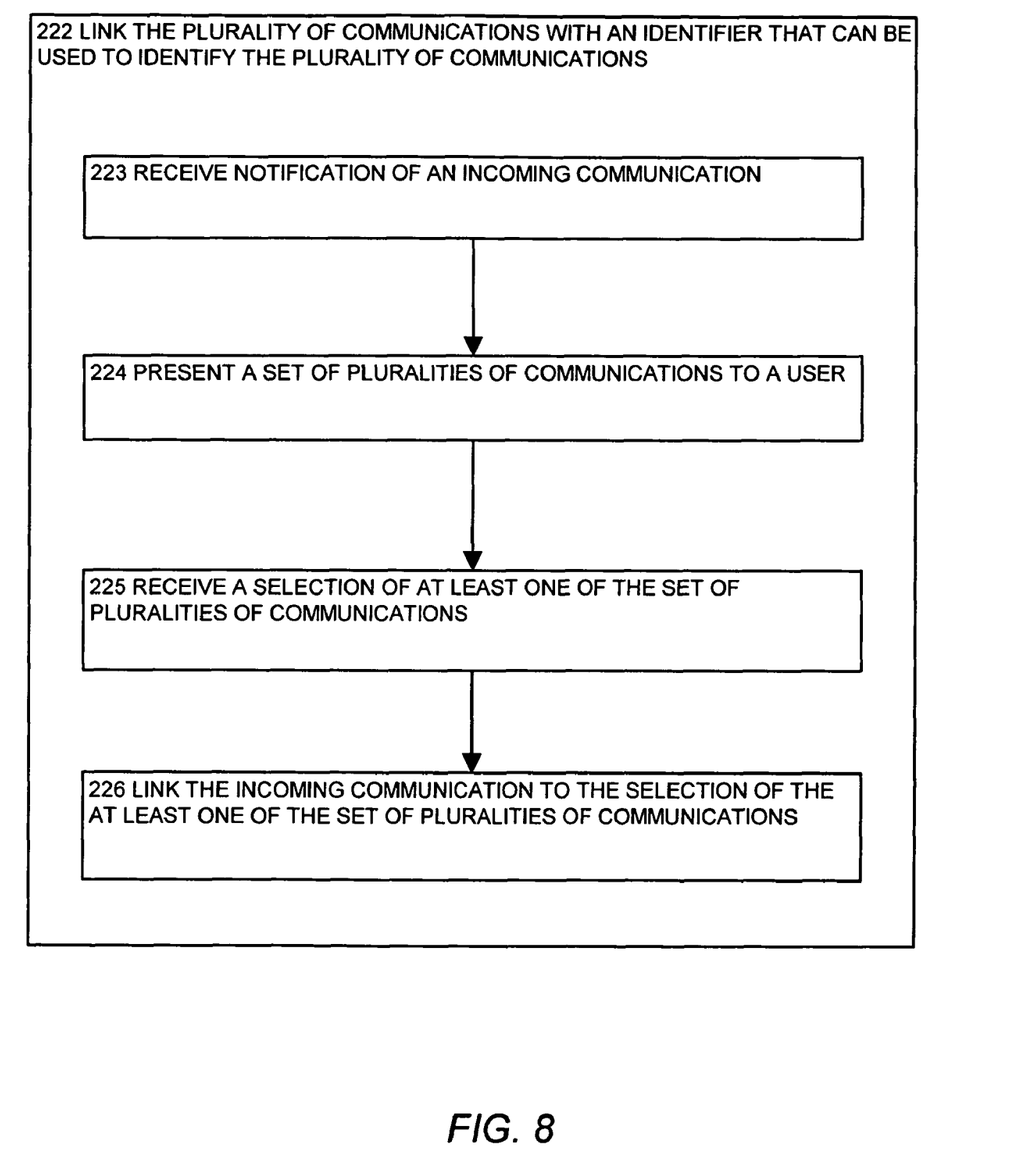
FIG. 8 illustrates a flowchart of a procedure performed by the system of FIG. 1, when the multimedia tracking process links the plurality of communications with an identifier that can be used to identify the plurality of communications, according to one embodiment disclosed herein.

FIG. 8 is an embodiment of the steps performed by the multimedia tracking process 144-2 when it links the plurality of communications with an identifier that can be used to identify the plurality of communications.

In step 222, the multimedia tracking process 144-2 links the plurality of communications with an identifier that can be used to identify the plurality of communications. The multimedia tracking process 144-2 maintains the 'thread' of conversation by use of the unique identifier.

In step 223, the multimedia tracking process 144-2 receives notification of an incoming communication. The incoming communication could be, for example, an email, text message, instant message, phone call, etc.

In step 224, the multimedia tracking process 144-2 presents a set of pluralities of communications to a user 108. In an example embodiment, the multimedia tracking process 144-2 presents a list of active and inactive threads (i.e., pluralities of communications) to the user 108 on the interface 160, allowing the user 108 to select the appropriate thread (i.e., plurality of communications).

In step 225, the multimedia tracking process 144-2 receives a selection of at least one of the set of pluralities of communications. In an example embodiment, the interface 160 displays a list of active and inactive threads (i.e., pluralities of communications) to the user 108 and the user 108 makes the appropriate selection of the correct thread (i.e., plurality of communication) for the incoming communication.

In step 226, the multimedia tracking process 144-2 links the incoming communication to the selection (by the user 108) of the plurality of communications. In an example embodiment, the multimedia tracking process 144-2 links the incoming communication with the thread (i.e., plurality of communication) selected by the user 108, via the interface 160.

Figure 9:
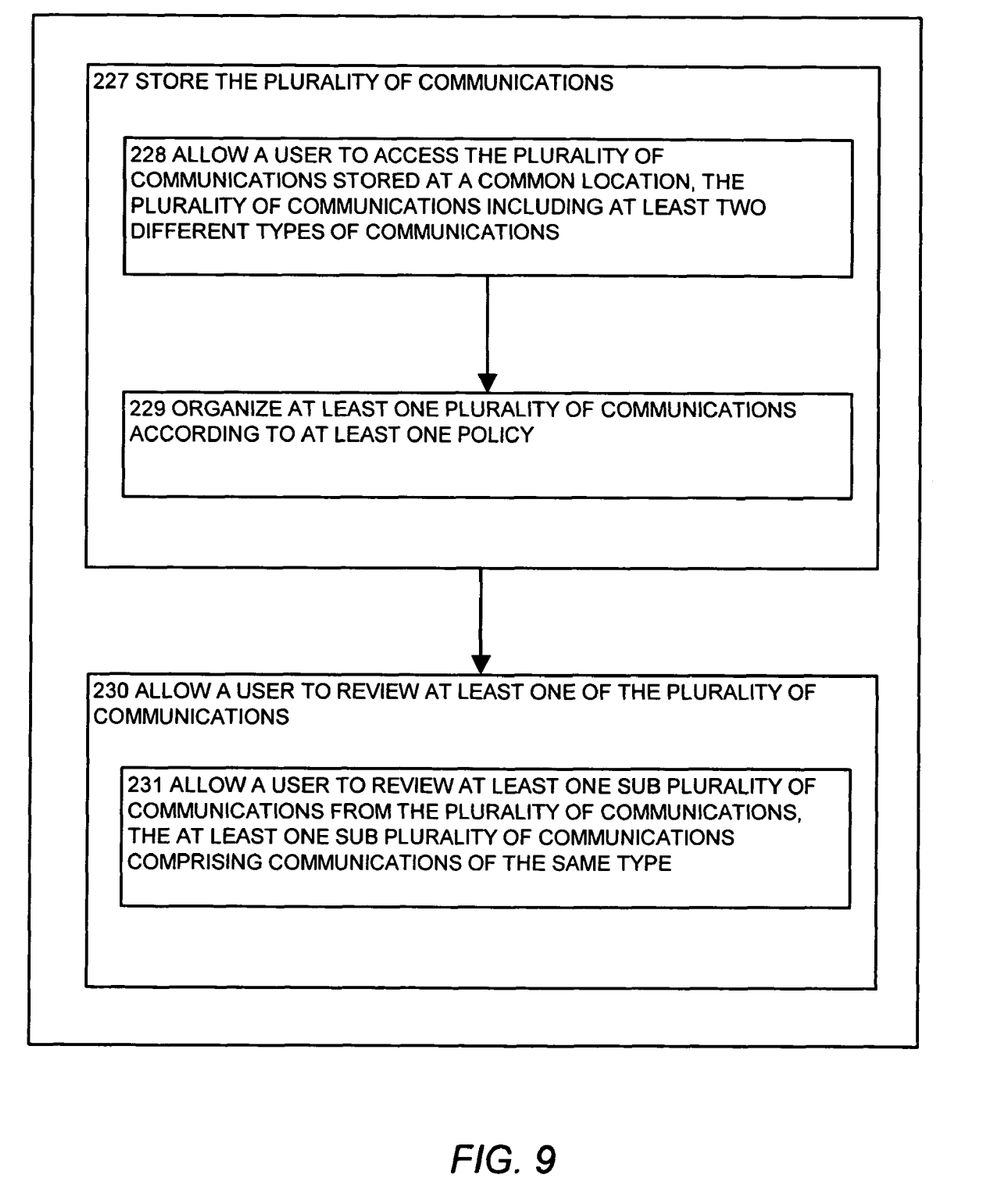
FIG. 9 illustrates a flowchart of a procedure performed by the system of FIG. 1, when the multimedia tracking process stores the plurality of communications, according to one embodiment disclosed herein.

FIG. 9 is an embodiment of the steps performed by the multimedia tracking process 144-2 when it stores the plurality of communications.

In step 227, the multimedia tracking process 144-2 stores the plurality of communications. In an example embodiment, the multimedia tracking process 144-2 stores the plurality of communications in a database in communication with the multimedia aggregator 142. The plurality of communications can be retrieved from the database, via database commands, such as Structured Query Language (SQL). The database may exist on the multimedia aggregator 142. The database may exist on a system separate from the multimedia aggregator 142, and may be accessed by the multimedia aggregator 142.

In step 228, the multimedia tracking process 144-2 allows a user 108 to access the plurality of communications (including at least two different types of communications) stored at a common location. The plurality of communications can be stored, for example, in a common folder, on a web page with links, etc. In an example embodiment, the multimedia tracking process 144-2 allows a user 108 to organize the plurality of communication such that the plurality of communication can be shared with other users 108-N.

In step 229, the multimedia tracking process 144-2 organizes at least one plurality of communications according to at least one policy. In an example embodiment, the multimedia tracking process 144-2 allow for collection of the plurality of communications according to a policy, such as a set of rules, a topic, unique identifier, global subject name, etc.

In step 230, the multimedia tracking process 144-2 allows a user 108 to review at least one of the pluralities of communications. The multimedia tracking process 144-2 provides an interface 160 with which a user can review and perform actions on pluralities of communication.

In step 231, the multimedia tracking process 144-2 allows a user 108 to review at least one sub plurality of communications from the plurality of communications. The sub plurality of communications comprises communications of the same type. In other words, the multimedia tracking process 144-2 allows a user 108 to view all the communications within a thread (i.e., a plurality of communications), or just a particular type of communication, such as all the emails within a thread (i.e., a plurality of communications), or all the phone calls within a thread (i.e., a plurality of communications), etc.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method of managing communications, the method comprising:
   collecting a plurality of communications including at least two different types of communications, wherein collecting a plurality of communications including at least two different types of communications comprises:
   receiving a first communication;
   attaching a header to the first communication; and linking the plurality of communications with an identifier that can be used to identify the plurality of communications;
wherein linking the plurality of communications with an identifier that can be used to identify the plurality of communications comprises:
receiving at least one subsequent communication; and
associating the at least one subsequent communication with the first communication via the header, wherein associating the at least one subsequent communication with the first communication via the header comprises:
parsing the at least one subsequent communication to obtain content associated with the at least one subsequent communication; and
correlating the content associated with the at least one subsequent communication with content associated with the first communication;
storing the plurality of communications; and
receiving confirmation from a user that a correct association was made between content associated with the at least one subsequent communication and content associated with the first communication.

2. The method of claim 1 comprising:
allowing a user to perform an action on at least one of the plurality of communications.

3. The method of claim 2 wherein allowing a user to perform an action on at least one of the plurality of communications comprises:
allowing a user to create at least one sub plurality of communications from the plurality of communications, each of the at least one sub plurality of communications having a unique identifier different from the identifier associated with the plurality of communications from which each of the at least one sub plurality of communications is created.

4. The method of claim 2 wherein allowing a user to perform an action on at least one of the plurality of communications comprises:
allowing a user to create at least one super plurality of communications from at least two pluralities of communications; and
associating a unique identifier to the at least one super plurality of communications.

5. The method of claim 2 wherein allowing a user to perform an action on at least one of the plurality of communications comprises:
providing an interface with which to allow a user to perform an action on at least one of the plurality of communications.

6. The method of claim 5 wherein providing an interface with which to allow a user to perform an action on at least one of the plurality of communications comprises:
allowing a user to respond to at least one of the plurality of communications with a responding communication.

7. The method of claim 6 comprising:
linking the responding communication with the plurality of communications.

8. The method of claim 1 comprising:
allowing a user to review at least one of the plurality of communications.

9. The method of claim 8 wherein allowing a user to review at least one of the plurality of communications comprises:
allowing a user to review at least one sub plurality of communications from the plurality of communications, the at least one sub plurality of communications comprising communications of the same type.

10. The method of claim 1 wherein collecting a plurality of communications including at least two different types of communications comprises:
identifying at least one of the plurality of communications as at least one of:
i) an email;
ii) a voicemail;
iii) a phone call;
iv) a short message service communication;
v) an instant message;
vi) a fax; and
vii) a video call.

11. The method of claim 1 comprising:
attaching the header to the at least one subsequent communication.

12. The method of claim 11 wherein said header contains a unique identifier by which the at least one subsequent communication will be identified.

13. The method of claim 1 wherein linking the plurality of communications with an identifier that can be used to identify the plurality of communications comprises:
receiving notification of an incoming communication;
presenting a set of pluralities of communications to a user;
receiving a selection of at least one of the set of pluralities of communications; and
linking the incoming communication to the selection of the at least one of the set of pluralities of communications.

14. The method of claim 1 wherein storing the plurality of communications comprises:
allowing a user to access the plurality of communications stored at a common location, the plurality of communications including at least two different types of communications.

15. The method of claim 1 wherein storing the plurality of communications comprises:
organizing at least one plurality of communications according to at least one policy.

16. The method of claim 1 further comprising providing a list of active pluralities of communications and inactive pluralities of communications and wherein said association between content associated with the at least one subsequent communication and content associated with the first communication comprises an association with at least one of said plurality of active communications.

17. A computerized device comprising:
a memory;
a processor;
a communications interface;
an interconnection mechanism coupling the memory, the processor and the communications interface;
wherein the memory is encoded with a multimedia tracking application that when executed on the processor is capable of tracking multimedia on the computerized device by performing the operations of:
collecting a plurality of communications including at least two different types of communications, wherein collecting a plurality of communications including at least two different types of communications comprises:
receiving a first communication;
attaching a header to the first communication; and
linking the plurality of communications with an identifier that can be used to identify the plurality of communications,
wherein linking the plurality of communications with an identifier that can be used to identify the plurality of communications comprises:
receiving at least one subsequent communication; and associating the at least one subsequent communication with the first communication via the header, wherein associating the at least one subsequent communication with the first communication via the header comprises:
    parsing the at least one subsequent communication to obtain content associated with the at least one subsequent communication; and
correlating the content associated with the at least one subsequent communication with content associated with the first communication;
storing the plurality of communications; and
receiving confirmation from a user that a correct association was made between content associated with the at least one subsequent communication and content associated with the first communication.

18. The computerized device of claim 17 wherein the computerized device is capable of performing the operation of:
    allowing a user to perform an action on at least one of the plurality of communications.

19. A computer readable medium encoded with computer programming logic that when executed on a process in a computerized device provides multimedia tracking, the medium comprising:
    instructions for collecting a plurality of communications including at least two different types of communications, wherein collecting a plurality of communications including at least two different types of communications comprises:
        receiving a first communication;
        attaching a header to the first communication; and
    instructions for linking the plurality of communications with an identifier that can be used to identify the plurality of communications,
    wherein linking the plurality of communications with an identifier that can be used to identify the plurality of communications comprises:
        receiving at least one subsequent communication; and
        associating the at least one subsequent communication with the first communication via the header, wherein associating the at least one subsequent communication with the first communication via the header comprises:
    parsing the at least one subsequent communication to obtain content associated with the at least one subsequent communication; and
correlating the content associated with the at least one subsequent communication with content associated with the first communication;
    instructions for storing the plurality of communications; and
receiving confirmation from a user that a correct association was made between content associated with the at least one subsequent communication and content associated with the first communication.

* * * * *